US008427920B2

(12) United States Patent
Suh

(10) Patent No.: US 8,427,920 B2
(45) Date of Patent: *Apr. 23, 2013

(54) INFORMATION RECORDING MEDIUM, METHOD OF CONFIGURING VERSION INFORMATION THEREOF, RECORDING AND REPRODUCING METHOD USING THE SAME, AND RECORDING AND REPRODUCING APPARATUS THEREOF

(75) Inventor: Sang Woon Suh, Seoul (KR)

(73) Assignee: LG Electronics Inc, Seoul (KR)

( * ) Notice: Subject to any disclaimer, the term of this patent is extended or adjusted under 35 U.S.C. 154(b) by 1459 days.

This patent is subject to a terminal disclaimer.

(21) Appl. No.: 11/701,446

(22) Filed: Feb. 2, 2007

(65) Prior Publication Data

US 2007/0156953 A1 Jul. 5, 2007

Related U.S. Application Data

(63) Continuation of application No. 10/885,767, filed on Jul. 8, 2004.

(30) Foreign Application Priority Data

Aug. 14, 2003 (KR) .................. 10-2003-0056543

(51) Int. Cl.
    *G11B 7/00* (2006.01)
(52) U.S. Cl.
    USPC .................... 369/59.25; 369/53.22
(58) Field of Classification Search ............... 369/59.25, 369/53.22, 53.2
See application file for complete search history.

(56) References Cited

U.S. PATENT DOCUMENTS

| 5,361,173 | A | 11/1994 | Ishii et al. |
| 5,486,469 | A | 1/1996 | Antranikian et al. |
| 5,590,096 | A | 12/1996 | Ohtsuka et al. |
| 5,636,631 | A | 6/1997 | Waitz et al. |
| 5,764,621 | A | 6/1998 | Choi |
| 5,793,546 | A | 8/1998 | Tanaka |
| 5,835,462 | A | 11/1998 | Mimnagh |
| 5,878,020 | A | 3/1999 | Takahashi |
| 5,892,633 | A | 4/1999 | Ayres et al. |
| 5,959,962 | A | 9/1999 | Matsumaru et al. |
| 6,005,837 | A | 12/1999 | Bruekers |
| 6,330,215 | B1 | 12/2001 | Lim |

(Continued)

FOREIGN PATENT DOCUMENTS

| CN | 1151071 | 6/1997 |
| CN | 1229503 | 9/1999 |

(Continued)

OTHER PUBLICATIONS

PCT International Search Report dated Oct. 8, 2004.

(Continued)

*Primary Examiner* — Latanya Bibbins
(74) *Attorney, Agent, or Firm* — Harness, Dickey & Pierce, P.L.C.

(57) ABSTRACT

In one embodiment, the method includes generating version information including a first version information and a second version information. At least one of the first version information and the second version information is to determine a backward compatibility with respect to reading or writing of the recording medium. The version information is recorded on a specific area of the recording medium.

21 Claims, 10 Drawing Sheets

U.S. PATENT DOCUMENTS

| | | | |
|---|---|---|---|
| 6,415,435 B1 | 7/2002 | McIntyre | |
| 6,480,450 B1 | 11/2002 | Fujii et al. | |
| 6,487,713 B1 | 11/2002 | Cohen et al. | |
| 6,504,806 B1 | 1/2003 | Nakajo | |
| 6,535,470 B1 | 3/2003 | Wu | |
| 6,560,403 B1 | 5/2003 | Tanaka et al. | |
| 6,580,671 B1 | 6/2003 | Otomo et al. | |
| 6,600,716 B1 | 7/2003 | Kondo | |
| 6,643,233 B1 | 11/2003 | Yen et al. | |
| 6,684,328 B2 | 1/2004 | Matsuura | |
| 6,868,054 B1 | 3/2005 | Ko | |
| 6,894,961 B1 | 5/2005 | Osakabe | |
| 6,996,047 B2 | 2/2006 | Nagano | |
| 6,999,393 B2 | 2/2006 | Yamada | |
| 7,012,878 B2 | 3/2006 | Shinotsuka et al. | |
| 7,046,605 B1 * | 5/2006 | Ko | 369/53.2 |
| 7,075,871 B2 | 7/2006 | Kato et al. | |
| 7,088,667 B2 | 8/2006 | Kobayashi | |
| 7,151,729 B1 | 12/2006 | Park et al. | |
| 7,161,881 B2 | 1/2007 | Pereira | |
| 7,170,841 B2 | 1/2007 | Shoji et al. | |
| 7,193,948 B2 | 3/2007 | Furukawa et al. | |
| 7,212,480 B2 | 5/2007 | Shoji et a | |
| 7,218,585 B2 | 5/2007 | Tanii et al. | |
| 7,230,907 B2 | 6/2007 | Shoji et al. | |
| 7,286,455 B2 | 10/2007 | Shoji et al. | |
| 7,369,475 B2 | 5/2008 | Nagai | |
| 7,376,072 B2 | 5/2008 | Shoji et al. | |
| 7,400,571 B2 | 7/2008 | Shoji et al. | |
| 7,423,951 B2 | 9/2008 | Shoji et al. | |
| 7,471,879 B2 | 12/2008 | Fuchigami et al. | |
| 7,650,362 B2 | 1/2010 | Suh | |
| 7,706,230 B2 | 4/2010 | Kim | |
| 2001/0044935 A1 * | 11/2001 | Kitayama | 717/11 |
| 2001/0053115 A1 | 12/2001 | Nobukuni et al. | |
| 2002/0021656 A1 | 2/2002 | Tsukagoshi et al. | |
| 2002/0044509 A1 | 4/2002 | Nakajima | |
| 2002/0048241 A1 | 4/2002 | Kumagai et al. | |
| 2002/0048646 A1 | 4/2002 | Tomura et al. | |
| 2002/0085470 A1 | 7/2002 | Yokoi | |
| 2002/0089919 A1 | 7/2002 | Ko et al. | |
| 2002/0126604 A1 | 9/2002 | Powelson et al. | |
| 2002/0126611 A1 | 9/2002 | Chang | |
| 2002/0150014 A1 | 10/2002 | Nijboer et al. | |
| 2002/0167880 A1 | 11/2002 | Ando et al. | |
| 2002/0172499 A1 | 11/2002 | Tozaki et al. | |
| 2003/0021201 A1 | 1/2003 | Kobayashi | |
| 2003/0021202 A1 | 1/2003 | Usui et al. | |
| 2003/0058771 A1 | 3/2003 | Furukawa et al. | |
| 2003/0067859 A1 | 4/2003 | Weijenbergh et al. | |
| 2003/0067862 A1 | 4/2003 | Rilum et al. | |
| 2003/0086345 A1 | 5/2003 | Ueki | |
| 2003/0137915 A1 | 7/2003 | Shoji et al. | |
| 2003/0151994 A1 | 8/2003 | Tasaka et al. | |
| 2003/0159135 A1 | 8/2003 | Hiller et al. | |
| 2003/0223339 A1 | 12/2003 | Taniguchi et al. | |
| 2003/0231567 A1 | 12/2003 | Moritomo | |
| 2004/0001407 A1 | 1/2004 | Kim et al. | |
| 2004/0004921 A1 | 1/2004 | Lee et al. | |
| 2004/0010745 A1 | 1/2004 | Lee et al. | |
| 2004/0022150 A1 | 2/2004 | Lee et al. | |
| 2004/0030962 A1 | 2/2004 | Swaine et al. | |
| 2004/0076097 A1 | 4/2004 | Sawabe et al. | |
| 2004/0184395 A1 | 9/2004 | Lee et al. | |
| 2004/0184396 A1 | 9/2004 | Lee et al. | |
| 2005/0019023 A1 | 1/2005 | Ko | |
| 2005/0036425 A1 | 2/2005 | Suh et al. | |
| 2005/0038957 A1 | 2/2005 | Suh | |
| 2005/0254413 A1 | 11/2005 | Kim | |
| 2006/0198261 A1 | 9/2006 | Lee | |
| 2006/0233059 A1 | 10/2006 | Suh et al. | |
| 2007/0088954 A1 | 4/2007 | Furukawa et al. | |
| 2007/0115765 A1 | 5/2007 | Kobayashi | |
| 2007/0156953 A1 | 7/2007 | Suh | |
| 2008/0043588 A1 | 2/2008 | Suh et al. | |
| 2009/0129249 A1 * | 5/2009 | Lee et al. | 369/272.1 |

FOREIGN PATENT DOCUMENTS

| | | |
|---|---|---|
| CN | 1656544 | 8/2005 |
| EP | 0265984 | 5/1988 |
| EP | 0 552 903 | 7/1993 |
| EP | 0506680 B1 | 12/1997 |
| EP | 0821817 B1 | 6/1999 |
| EP | 0571926 B1 | 8/1999 |
| EP | 0968769 | 1/2000 |
| EP | 1172810 | 1/2002 |
| EP | 1244097 | 9/2002 |
| EP | 1 293 981 | 3/2003 |
| EP | 1 293 981 A1 | 3/2003 |
| EP | 1308942 | 5/2003 |
| EP | 1329888 | 7/2003 |
| EP | 1331631 | 7/2003 |
| EP | 1361571 | 11/2003 |
| EP | 1369850 | 12/2003 |
| EP | 1471506 | 10/2004 |
| EP | 1 522 994 | 4/2005 |
| EP | 1605445 | 12/2005 |
| JP | 6-150333 A | 5/1994 |
| JP | 9-147487 | 6/1997 |
| JP | 09-160761 | 6/1997 |
| JP | 11-025607 A | 1/1999 |
| JP | 11-066607 A | 3/1999 |
| JP | 11-085413 | 3/1999 |
| JP | 11-086451 A | 3/1999 |
| JP | 2000-113458 | 4/2000 |
| JP | 2001256716 A | 9/2001 |
| JP | 2001-297447 | 10/2001 |
| JP | 2001-312861 | 11/2001 |
| JP | 2002-50040 | 2/2002 |
| JP | 2002-050053 | 2/2002 |
| JP | 2002-74855 | 3/2002 |
| JP | 2002-124038 | 4/2002 |
| JP | 2002-245625 | 8/2002 |
| JP | 2003-059062 A | 2/2003 |
| JP | 2003-203341 | 7/2003 |
| JP | 2003-257026 | 9/2003 |
| JP | 2004-005772 | 1/2004 |
| JP | 2006-520991 | 9/2004 |
| JP | 2005503623 | 2/2005 |
| JP | 2005149655 | 6/2005 |
| JP | 2005310358 | 11/2005 |
| JP | 2006031907 A | 2/2006 |
| JP | 2006517711 | 7/2006 |
| JP | 2006520990 | 9/2006 |
| KR | 1998-0011382 | 4/1998 |
| KR | 10-0183583 B1 | 12/1998 |
| RU | 2225043 C1 | 2/2004 |
| TW | 430785 | 4/2001 |
| TW | 460861 | 10/2001 |
| TW | 484127 | 4/2002 |
| TW | 541522 | 7/2003 |
| TW | 200301465 A | 7/2003 |
| TW | 200306535 | 11/2003 |
| WO | WO 97/13244 | 4/1997 |
| WO | WO 00/79525 | 12/2000 |
| WO | WO 02/29791 | 4/2002 |
| WO | WO 02/065462 | 8/2002 |
| WO | WO 02/089123 | 11/2002 |
| WO | WO 03/010519 | 2/2003 |
| WO | WO 03/025935 | 3/2003 |
| WO | WO 03/067581 | 8/2003 |
| WO | WO 03/075265 | 9/2003 |
| WO | WO 03/100775 | 12/2003 |
| WO | WO 03/102930 A1 | 12/2003 |
| WO | WO 03/105139 | 12/2003 |
| WO | WO 2004/013845 | 2/2004 |
| WO | WO 2004/072966 | 8/2004 |
| WO | WO 2005/001819 | 1/2005 |
| WO | WO 2005/017885 | 2/2005 |

OTHER PUBLICATIONS

Taiwanese Office Action dated Nov. 16, 2006, with English translation.

European Search Report dated Jan. 13, 2011 for EP Application No. 10184078.

Taiwan Office Action dated Jan. 10, 2011 for TW Application No. 96109003.
Office Action for Chinese patent application No. 2007100059787 dated Oct. 10, 2008.
Office Action for Chinese patent application No. 2007100059715 dated Feb. 6, 2009.
Korean Notice of Allowance dated Feb. 21, 2011 for Korean Application No. 10-2003-0056543.
US Office Action dated Mar. 19, 2010 cited in U.S. Appl. No. 11/189,767.
US Office Action dated Mar. 30, 2010 cited in U.S. Appl. No. 10/885,767.
US. Office Action dated Apr. 1, 2010 cited in U.S. Appl. No. 12/000,646.
Search Report for corresponding European application dated Apr. 15, 2008.
Office Action for Japanese patent application No. 2007-047071 dated Jun. 9, 2009.
Russian Notice of Allowance dated Jun. 28, 2010 for Russian Application No. RU 2007/107082.
Russian Office Action dated Jun. 23, 2008.
An Office Action dated Aug. 11, 2009 issued in corresponding Japanese Application No. JP 2007-047068.
U.S. Office Action dated Aug. 18, 2009 in counterpart U.S. Appl. No. 11/189,767.
Search Report for counterpart European patent application No. 07120273.3-2210/1923870 dated Jul. 2, 2008.
Japanese Office Action dated Aug. 11, 2009 corresponding to application No. 2007-047068.
Japanese Office Action dated Sep. 10, 2010 for JP Application No. 2007/523475.
U.S. Office Action dated Oct. 5, 2010 for U.S. Appl. No. 10/885,767.
Japanese Office Action dated Nov. 9, 2010 for JP Application No. 2007-513070.
Chinese Patent Gazette dated Nov. 3, 2010 for CN Application No. 200580025599.3.
US Office Action dated Aug. 25, 2011, issued for U.S. Appl. No. 12/656,844.
Chinese Office Action dated May 11, 2011, for Application 200580012716.2.
Japanese Office Action dated Jun. 10, 2011, for Application 2007-513070.
Taiwanese Office Action dated May 31, 2012 for corresponding Taiwanese Application No. 094125448 (full English language translation provided).
Taiwanese Office Action for corresponding Taiwanese Application No. 094115646 dated May 11, 2012.
U.S. Office Action dated Mar. 2, 2012, for U.S. Appl. No. 10/885,767.
In re Rose, Patent Appeal No. 6080, United States Court of Customs and Patent Appeals, Mar. 22, 1955, 105 USPQ 237 (CCPA 1955).

* cited by examiner

INFORMATION RECORDING MEDIUM, METHOD OF CONFIGURING VERSION INFORMATION THEREOF, RECORDING AND REPRODUCING METHOD USING THE SAME, AND RECORDING AND REPRODUCING APPARATUS THEREOF

DOMESTIC PRIORITY INFORMATION

This is a continuation application of application Ser. No. 10/885,767 filed Jul. 8, 2004, the entire contents of which are hereby incorporated by reference.

FOREIGN PRIORITY INFORMATION

This application claims the benefit of Korean Application No. 10-2003-0056543 filed on Aug. 14, 2003, which is hereby incorporated by reference.

BACKGROUND OF THE INVENTION

1. Field of the Invention

The present invention relates to information recording medium, such as an optical disc, a method of recording disc version information thereof, recording and/or reproducing method using the disc version information recording and/or reproducing, and a recording and reproducing apparatus thereof.

2. Discussion of the Related Art

Generally, information recording medium, e.g., an optical disc on which a large volume of data is recordable is widely used as an optical record medium. Recently, many efforts are made to develop a new high density optical record medium (HD-DVD), on which video data of high definition and audio data of high quality, program data of large capacity can be recorded and stored, such as a Blu-ray disc (BD) and the like.

The Blu-ray disc that is a sort of a next generation HD-DVD technology is the next generation optical record solution enabling to be fully equipped with data to remarkably surpass the previous DVD, and the technology specifications of global standardizations for the Blu-ray disc are being established together with other digital equipment.

Various kinds of specifications associated with Blu-ray discs have been prepared. Specifically, various specifications for a 2×-speed (or higher) rewritable Blu-ray disc (BD-RE) following the 1×-speed BD-RE, a write-once Blu-ray disc (BD-WO), and a read-only Blu-ray disc (BD-ROM) have been prepared.

In spite of the same kind of Blu-ray disc, version of specified contents for the Blu-ray disc keeps being updated to keep up with the technological development. For instance, disc specifications of the 1×-speed rewritable Blu-ray disc are extending like those of the 2×-speed (or higher) rewritable Blu-ray disc do. Hence, the extending specified contents need to be managed as disc version information.

Referring to FIG. 1, FIG. 1 illustrates a method of representing DVD disc version information according to a related art, 4 bits are allocated to a management area of a disc to display version information. Whenever a new version is implemented, additional bits are allocated to display the version.

The disc version information is used in determining whether a given recorder/reproducer can reproduce the data of a recorded disc. Hence, the disc version needs to be recorded by a more unified and extendible method. In the case of a BD-RE, BD-R, or BD-ROM disc of which specifications are under discussion, the method of recording the disc version information are being discussed as well. Therefore, an efficient solution for recording the disc version information in a high density optical disc is urgently needed, which should be provided as standardized information to secure mutual compatibility.

SUMMARY OF THE INVENTION

The present invention relates to a method of recording version information on recording medium.

In one embodiment, the method includes generating version information including a first version information and a second version information. At least one of the first version information and the second version information is to determine a backward compatibility with respect to reading or writing of the recording medium. The version information is recorded on a specific area of the recording medium.

The present invention also relates to a method for recording information including a version information on a recording medium.

One embodiment of this method includes allocating information byte for a version information including first information and second information within control information. At least one of the first and second information determines a compatibility of recording medium. The information byte is recorded on a specific area of the information recording medium.

The present invention also relates to a method for recording version information on an optical disc.

In one embodiment, the method includes generating the version information including first version information compatible with previous version and real version information. The compatible version information and the real version information is recorded in at least two separate areas, respectively.

The present invention further relates to a data structure for version information of a recording medium. The data structure includes the version information having first version information and a second version information. The one of first and second version information is used to determine to a backward compatibility with respect to reading or writing of the recording medium.

The present invention also relates to an apparatus for recording version information on a recording medium.

In one embodiment, the apparatus includes a controller for generating version information including a first version information and a second version information. At least one of the first version information and the second version information is to determine a compatibility of the recording medium. A recording part records the version information on a specific area of the recording medium.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
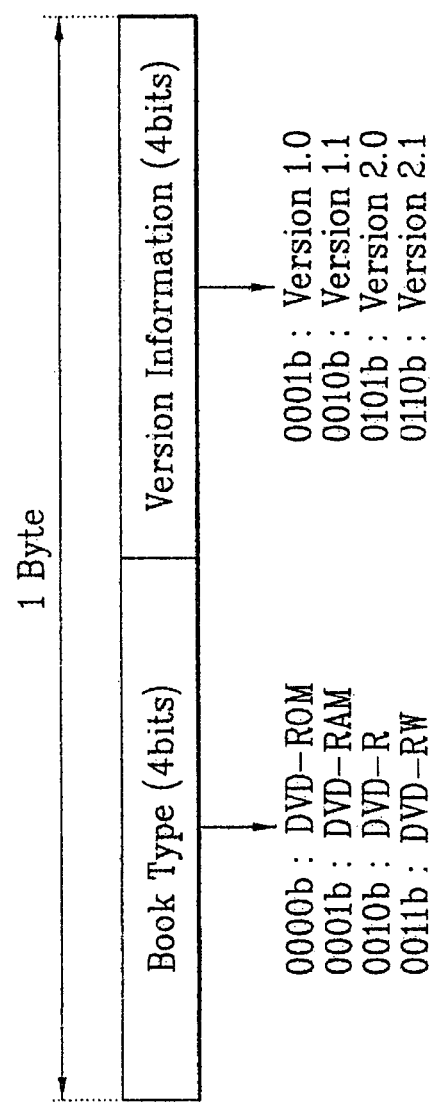
FIG. 1 is a diagram of a method of displaying disc version information in DVD according to a related art.

Reference will now be made in detail to the preferred embodiments of the present invention, examples of which are illustrated in the accompanying drawings. Wherever possible, the same reference numbers will be used throughout the drawings to refer to the same or like parts.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

For convenience of explanation, a Blu-ray disc (BD) is taken as an example of an optical disc according to the present invention. Yet, it is apparent that the concept of the present invention is characterized in an optical disc having its disc version information updated to be applicable to DVD, e.g., DVD-RAM/-R/-RW/+R/+RW and the like for example.

The present invention related to a method of recording disc version information. Newly defined disc version information is firstly explained and the method is then explained in detail as follows.

First of all, regarding 'disc version information', as mentioned in the foregoing description, a disc version is newly defined whenever new specification item is added according to the development of disc technology of the same kind and a disc manufacturer records in a specific area of a disc information that the corresponding disc is prepared by which version, whereby a recording/reproducing apparatus (shown in FIG. 8) for recording and/or reproducing the corresponding disc reads and identifies the disc version information recorded in the disc for recording/reproducing.

In configuring 'disc version information', the present invention follows the rules in the following. First of all, disc version information is divided into three parts to represent and is defined as follows. A first version information means new specifications in the same kind of disc format that reciprocal compatibility with a previous version, e.g., backwards compatibility with respect to reading or writing, is not secured since physical specifications of the disc are changed. A second version information means addition to the corresponding specifications with the same number of first version information that the reciprocal compatibility is maintained if the first version information is identical in spite that the physical specifications of the disc are changed, e.g., writing condition or reading condition of the disc is changed. And, a third version information means the compatibility is always maintained reciprocally by adding/changing editorial of specifications only in case that the physical specifications of the disc are not changed.

And, the first to third version information are described in the following manner for the definition thereof. For instance, if version information of a predetermined disc is represented by 'Va.bc', 'a' means the first version information, 'b' means the second version information, and 'c' means the third version information. Hence, if the disc version information is 'V1.00', the first to third version information become '1', '0', and '0', respectively.

Assuming that a specification item of a new version is added to the disc version 'V1.00', the version information will be represented by 'V2.00' if the added specification item is a new physical specification failing to maintain the compatibility with the previous version 'V1.00'. The version information will be represented by 'V1.00' if the added specification item is a new physical specification maintaining the compatibility with the previous version 'V1.00'. The version information will be represented by 'V1.01' if it is addition/change of specification-editorial having no change of the physical specification item.

In recording the disc version information in the disc, the third version information may be unnecessary. The disc version information is recorded in the disc so that the recording and/or reproducing apparatus (shown in FIG. 8) efficiently copes with the change of the physical specifications of the disc. As the third version information corresponds to the case that the physical specifications fail to be changed, the record layback apparatus need not look up the third version information. Hence, in representing the disc version information, the present invention mainly deals with the first and second version information. Yet, it is apparent that the third version information can be recorded in the same manner as well.

Namely, the present invention divides the disc version information into the first version information and the second version: information at least and defines areas where the first and second version information are recorded, respectively. Hence, the present invention enables to record the disc version information efficiently and to actively cope with the extension of the disc version.

Figure 2:
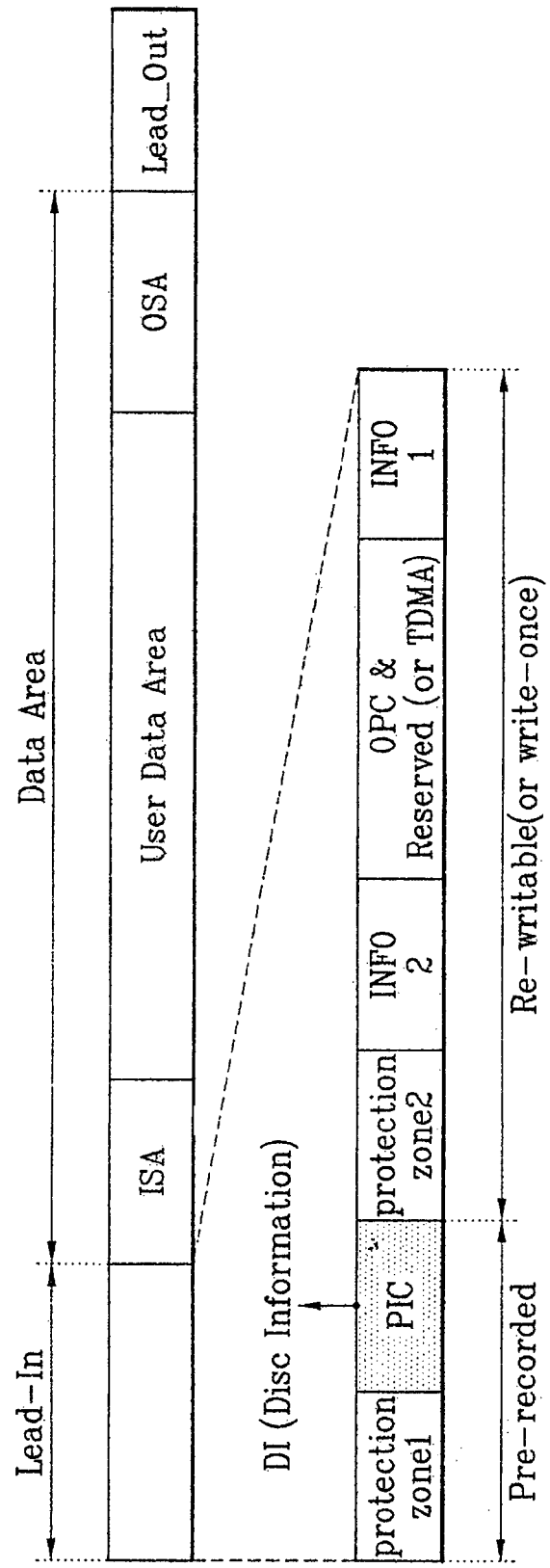
FIG. 2 is a structural diagram of a single-layered disc according, to the present invention.
Figure 3:
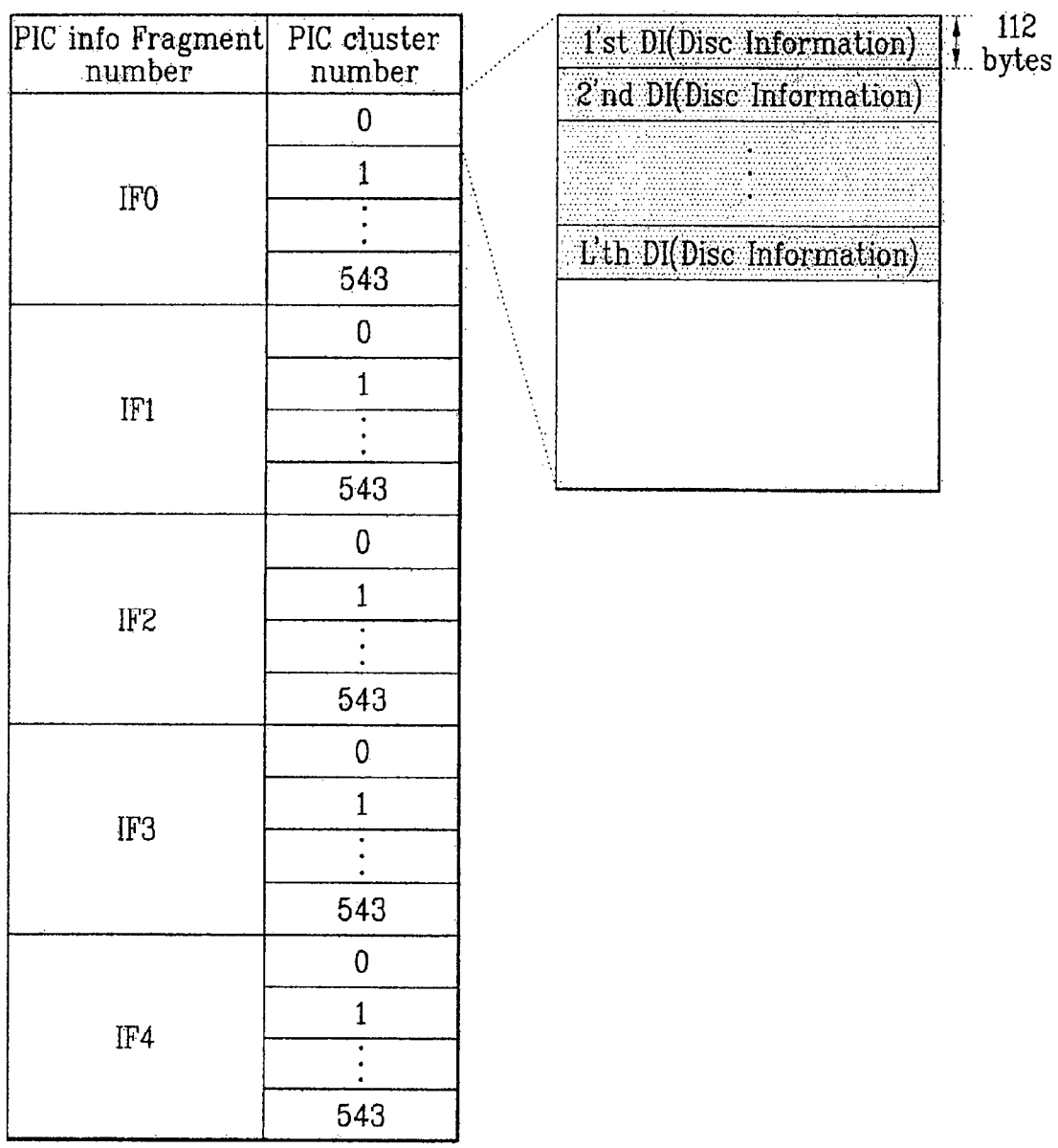
FIG. 3 is a structural diagram of a management area where disc version information of the present invention is recorded.

FIG. 2 and FIG. 3 are a structural diagram of a single-layered disc and a diagram of a method of recording disc control information including disc version information. A playback-only optical disc as well as a recordable optical disc is applicable to the present invention.

As mentioned in the foregoing description, for convenience of explanation, a Blu-ray disc (BD) is taken as an example of an optical disc according to the present invention. Yet, it is apparent that the concept of the present invention is characterized in an optical disc having its disc version information updated to be applicable to DVD-RAM/–RW/+RW and the like for example.

Moreover, 'disc control information' including disc version information means information or area including various kinds of information for disc recording and/or reproducing. For instance, a Blu-ray disc names it 'disc information' or DVD-RAM/–RW/+W names it 'physical format information'.

First of all, 'disc information (hereinafter abbreviated DI)' corresponding to a case of a Blu-ray disc (BD) is explained for convenience as follows.

FIG. 2 is a structural diagram of a single-layered disc having one record layer according to the present invention, in which disc information including disc version information of the present invention is recorded in a disc.

Referring to FIG. 2, a lead-in area is provided on an inner circumference area of an optical disc, whereas a lead-out area is provided on an outer circumference area of the optical disc. Specifically, a pre-recorded area and a rewritable or write once area are separate from each other within the inner circumference area of the disc. The pre-recorded area is an area where data was already recorded in manufacturing the disc, whereby a user or system is unable to perform data recording on the pre-recorded area at all. In BD-RE/WO, the pre-recorded area is named PIC (permanent information and control data) area. And, disc information as information required for disc recording is recorded in the PIC area. In a data area, provided are a user data area where user's real data is recorded and spare areas ISA and OSA to replace a generated defect area. Specifically, TDMA (temporary defect management area) for recording information of defect and general management is provided within a management are in such a write-once optical disc as BD-WO. In case of the re-writable BD-RE, TDMA is unnecessary to remain as a reserved area.

The present invention intends to provide a method of recording disc version information efficiently as well as a method of recording speed information for recording and/or reproducing and write strategy (hereinafter abbreviated WS) as disc information in the pre-recorded area.

It is apparent that a recording method in the pre-record area is differently applied to each kind of standardized discs. Yet, in case of BD-RE/WO, the PIC area as the pre-recorded area is recorded by bi-phased high frequency modulated signals, the high frequency modulated signals in the corresponding area are played back according to a specific playback method, and information is acquired from the playback.

FIG. 3 is a structural diagram of a PIC area in the disc shown in FIG. 2. As mentioned in the foregoing description, it means that information can be rearranged like the structure of the PIC area in FIG. 3 when the entire information within the high frequency modulated PIC area is acquired. Yet, it does not mean that the PIC area is not physically constructed like the structure in FIG. 3.

In BD-RE/WO, 'one cluster' represents a minimum record unit, 544 clusters gather to construct one fragment as one upper record unit, and total five fragments gather to form the PIC area.

Disc information is recorded in a front head cluster of a first fragment IFO. The disc information is plurally recorded per record layer and speed permitted by the corresponding optical disc, and one disc information includes one hundred twelve bytes. Specifically, disc information constructed with 12 bytes is occasionally called disc information (DI) frame. Moreover, the same contents of the disc information are repeatedly recorded in each front head cluster of the rest of the fragments, thereby enabling to cope with loss of the disc information.

Information representing the corresponding record layer and speed and write strategy (WS) corresponding to the record layer and speed are recorded within each disc information of a recordable optical disc as well as disc version information. Hence, such information is utilized in recording and/or reproducing of the corresponding optical disc, thereby enabling efficient recording and/or reproducing.

If the optical disc is such a playback-only optical disc as BD-ROM, it is apparent that the speed information for the disc record and write strategy are not included in the disc information.

A method of recording disc version information within the above-explained disc information is explained in detail through various embodiments by referring to FIGS. 4 to 10 as follows.

Figure 4:
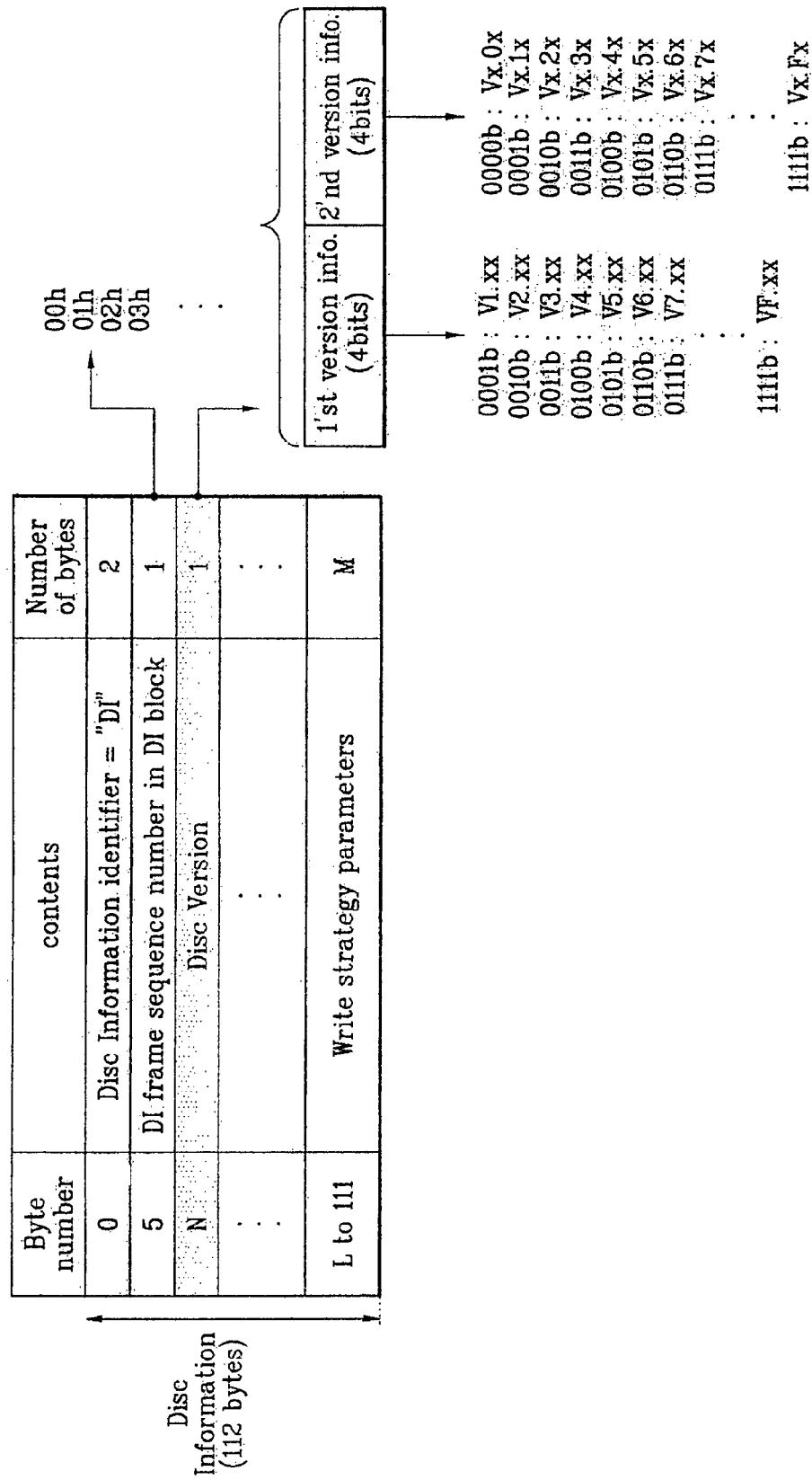
FIG. 4 is a diagram of a method of recording disc control information including disc version information according to one embodiment of the present invention.

FIG. 4 is a diagram of a method of recording disc information including disc version information according to one embodiment of the present invention, in which an area for recording disc version information is separately allocated.

Referring to FIG. 4, at least one disc information is recorded in a disc, and an order of each disc information is decided according to its sequence number to be recorded by one byte.

For instance, the corresponding information is recorded at a fifth byte within the disc information, is named 'DI frame sequence number in DI block', and is briefly represented by '00h, 01h, 02h, . . . '. Namely, if the information of the fifth byte is '00h', it means first disc information. If the information of the fifth byte is '03h', it means fourth disc information.

In case of a recordable optical disc, write strategy (WS) interoperating with the speed meant by the corresponding disc information is recorded in an area named 'write strategy parameters' field by $(L\sim111)^{th}$ bytes, and information for disc version is recorded in an area named 'disc version' field by $N^{th}$ byte.

The 'disc version' field is divided into two parts, in which first version information is recorded in first four bits and second four bits are allocated as an area for recording second version information therein. Hence, the first and second version information, each having four bits allocated thereto, enables to represent maximum fifteen versions. In other words, first version and second version represent each digit value by binary notation. A value of 'F' is a hexadecimal expression meaning '15' of decimal in case of 'Vx.Fx' or 'VF.xx' shown in FIG. 4. And, 'x' is an expression meaning that the corresponding version information is a value of 'don't' care'. The same expressions will be applied to another embodiments of the present invention that will be explained later.

If the 'disc version' field of $N^{th}$ byte is '0100 0010b', the first version information becomes '4' and the second version information becomes '2'. Hence, the version of the corresponding disc is 'V4.2x'.

Figure 5:
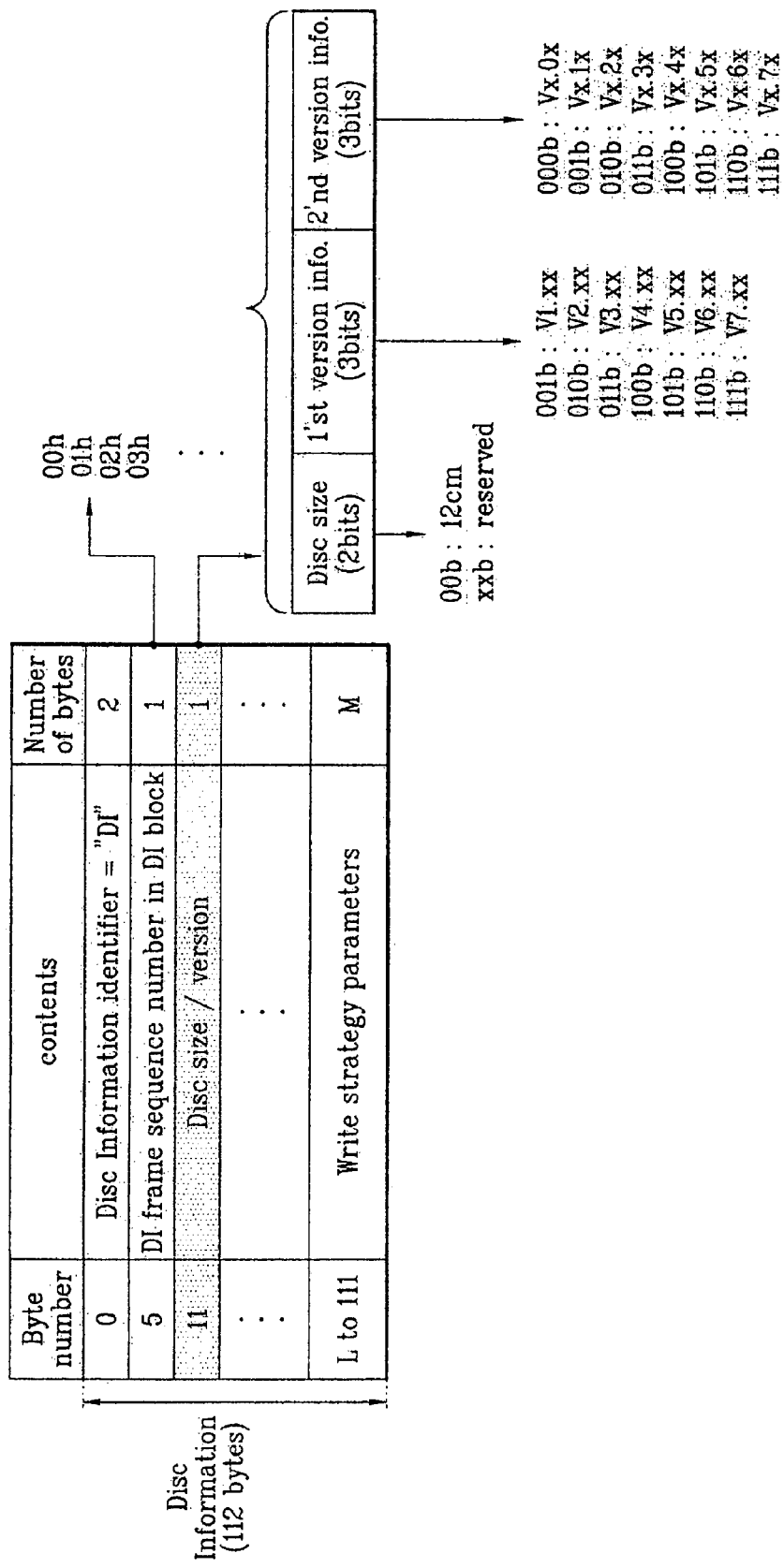
FIG. 5 is a diagram of a method of recording disc control information including disc version information according to another embodiment of the present invention.

FIG. 5 is a diagram of a method of recording disc information including disc version information according to another embodiment of the present invention, in which compatibility with a disc information recording method in the currently-discussed 1×-rewritable Blu-ray disc (BD-RE) is maintained.

Referring to FIG. 5, $11^{th}$ byte of disc information is named 'disc size/version' field where disc size information and version information are recorded. Size information, first version information, and second version information are recorded in first 2-bits, second 3-bits, and third 3-bits, respectively.

For the disc size information, since the currently discussed Blu-ray disc (BD) has 12 cm size only, '00b' means 12 cm and the rest are left as a reserved area for other disc sizes that will be added to the standardization later. For example, in case of 8 cm disc, it can be set to '01b'. For the disc version information, 3-bits among total 6-bits are allocated to each of the first version information and the second version information so that each version information enables to represent maximum seven.

If the $11^{th}$ byte is '00 001 010b', the disc size is 12 cm, the first version information becomes '1' and the second version information becomes '2'. Hence, the version of the corresponding disc is 'V1.2x'.

Figure 6:
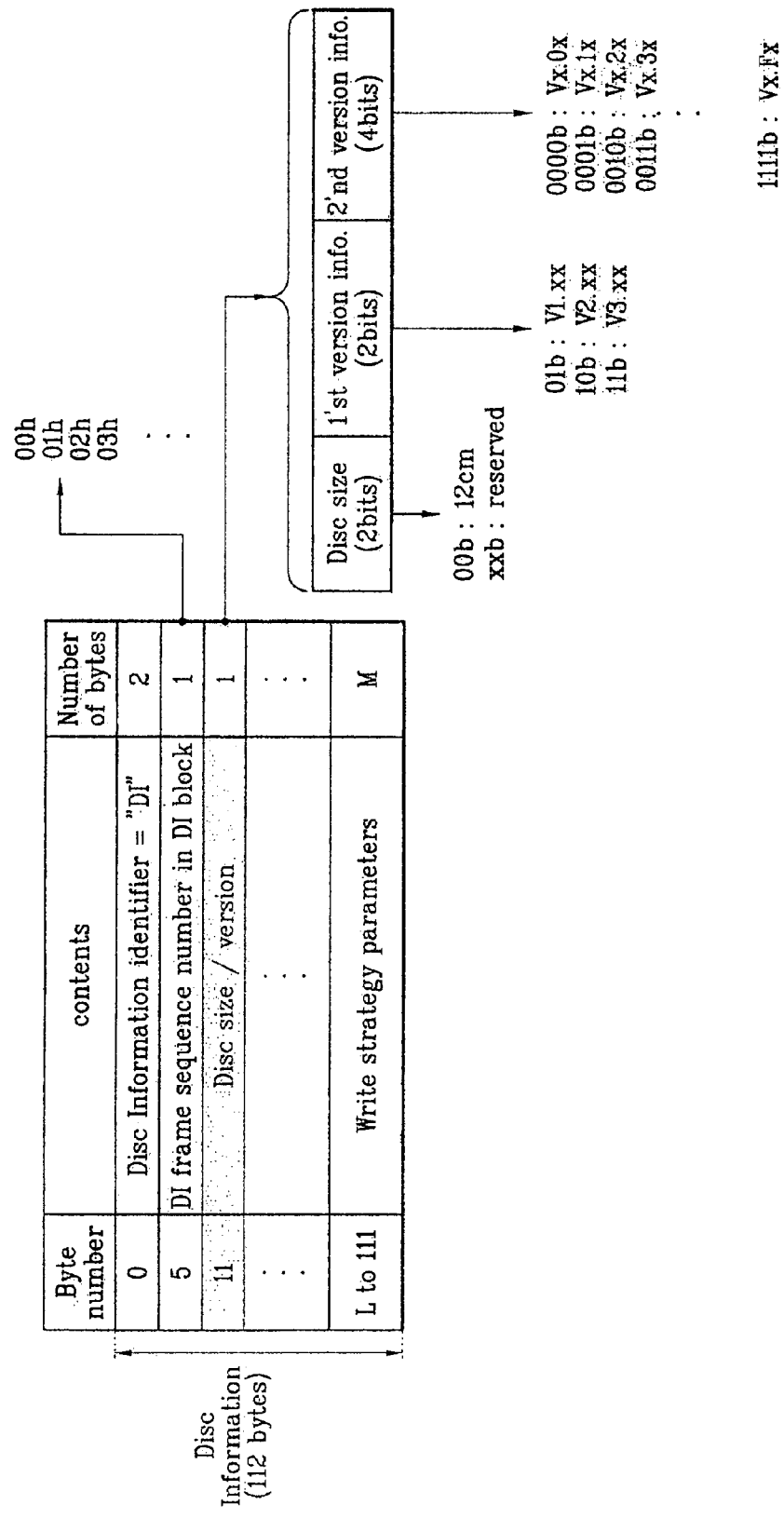
FIG. 6 and FIG. 7 are diagrams of a method of recording disc control information including disc version information according to another embodiment of the present invention.

FIG. 6 is a diagram of a method of recording disc information including disc version information according to another embodiment of the present invention, in which compatibility with a disc information recording method in the currently-discussed 1×-rewritable Blu-ray disc (BD-RE) is maintained like the embodiment of FIG. 5.

Referring to FIG. 6, 4-bits are allocated to the second version information and 2-bits are allocated to the first version information unlike the embodiment of FIG. 5. Even if physical specification change occurs in. the second version information, the reciprocal compatibility is maintained in case of the same first version information. For example, if there are two kinds of discs with version 2.1 and version 2.2 respectively, a physical specification change may occur between each disc with respect to second version, but the reciprocal compatibility is maintained because of the same first version information. In another case, if there are two kinds of discs with version 1.1 and version 2.1 respectively, a physical specification change may occur between each disc with respect to first version, and the reciprocal compatibility is not maintained because of the different first version information.

The above cases are actually applied to a relation between disc and drive. For example, if a disc with a version 2.x is loaded into an old drive, which controls a disc with version 1.x, then the drive should not access the disc with version 2.x to read or write data on the disc, because the drive do not have any hardware and/or software to control the disc with version 2.x. Otherwise, if a disc with a version X.3 is loaded into an old drive, which can control a disc with version X.2, then the drive may access the disc to read or write data on the disc, because the first version information is same.

Meanwhile, since it is highly probable that the version change may occur, more bits can be allocated to the second version information.

If $11^{th}$ byte is '00 10 0011b', the disc size is 12 cm, the first version information becomes '2' and the second version information becomes '3'. Hence, the version of the corresponding disc is 'V2.3x'.

Figure 7:
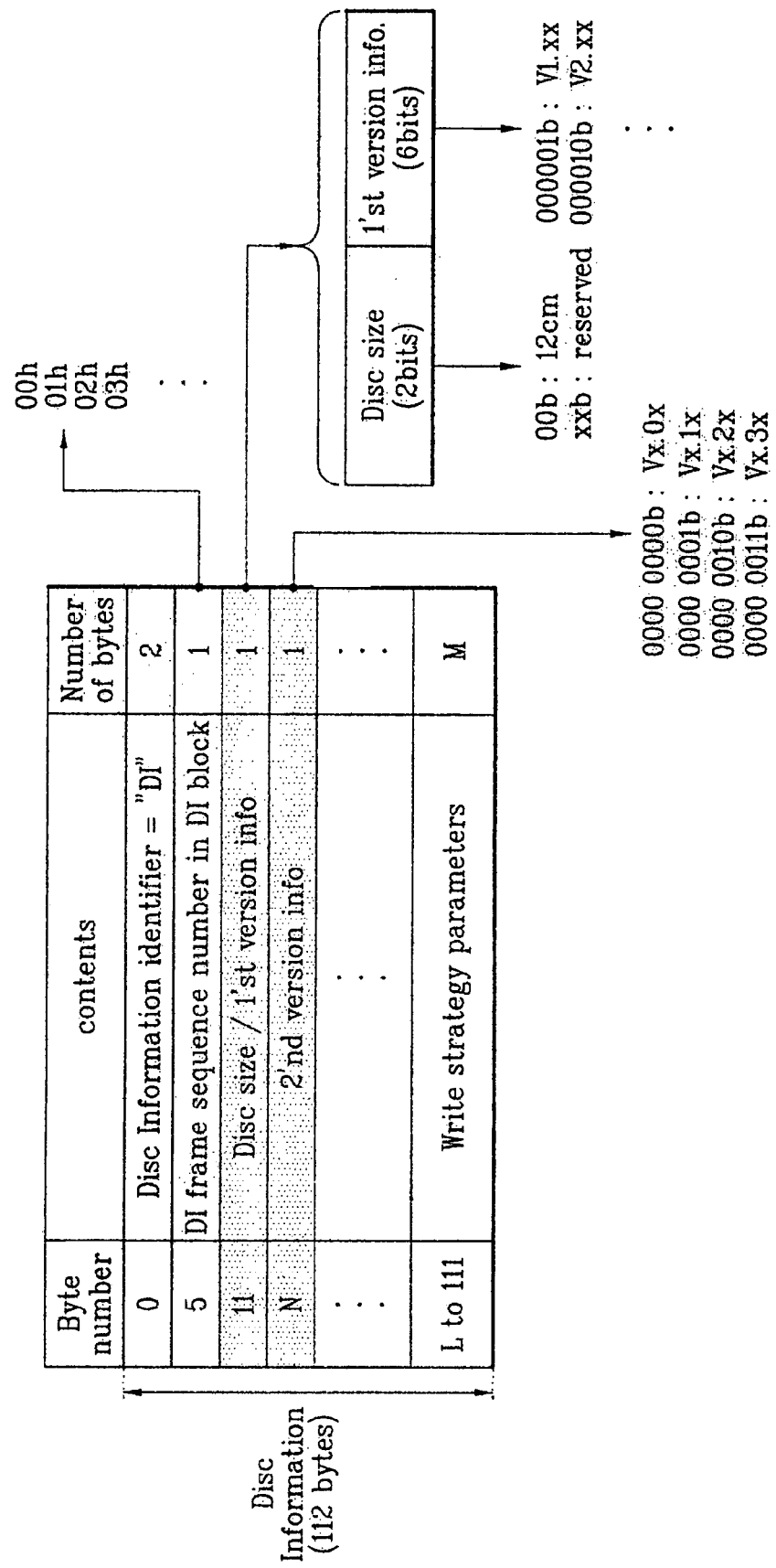

FIG. 7 is a diagram of a method of recording disc information including disc version information according to another embodiment of the present invention, in which compatibility with a disc information recording method in the currently-discussed 1×-rewritable Blu-ray disc (BD-RE) is maintained like the embodiment of FIG. 5 or FIG. 6.

Referring to FIG. 7, unlike the embodiment of FIG. 5 or FIG. 6, the first version information and the disc size information are recorded together in $11^{th}$ byte, whereas 1-byte is allocated to a separate reserved area ($N^{th}$ byte). As mentioned in the foregoing description, the embodiment of FIG. 7 considers allocation of more bits and multitude of reserved areas within the currently disc information since the version change probability of the second version information is higher than that of the first version information. Hence, it is also possible that the second version information is recorded in the $11^{th}$ byte and the first version information is recorded in the $N^{th}$ byte.

If the $11^{th}$ byte is '00 0000 10b' and the Nth byte is '0000 0100b', the disc size is 12 cm, the second version information becomes '4', and the first version information becomes '2'. Hence, the version of the corresponding disc is 'V2.4x'.

Figure 8:
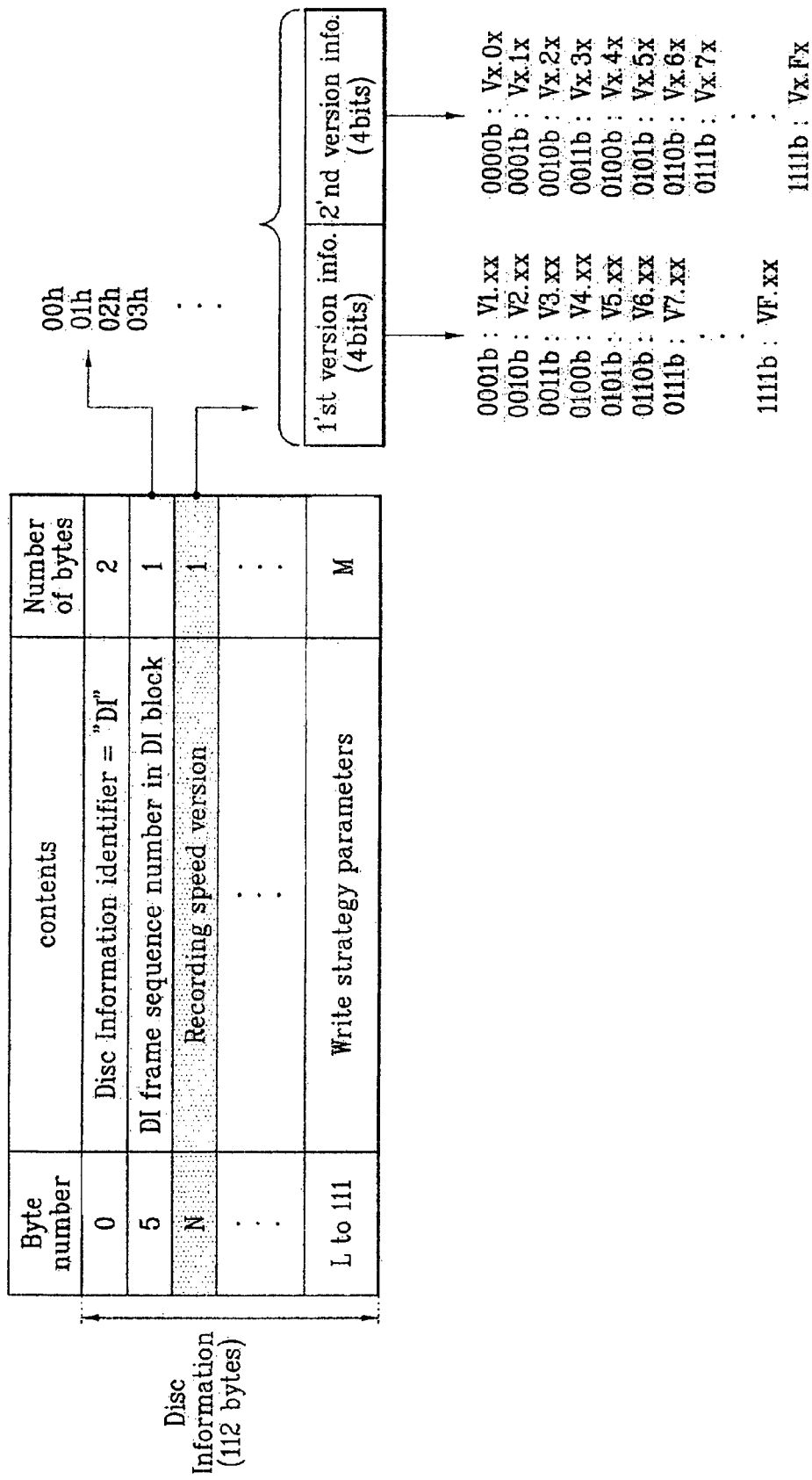
FIG. 8 and FIG. 9 are diagrams of a method of recording disc control information using disc version information according to another embodiment of the present invention.

FIG. 8 is a diagram of a method of recording disc control information using disc version information according to another embodiment of the present invention. Version information of the present invention means not disc specification version information but recording speed version information.

Namely, the recording speed version information recorded within disc information intends to represent a recording speed extending from a precious recording speed in the same manner of the above-described disc version information. For instance, in case of a recordable optical disc, a write strategy (WS) to cooperate with a speed meant by the corresponding disc information is recorded in an area named 'Write Strategy parameters' field of $L^{th}$~$111^{th}$ bytes and information for a recording speed version is recorded in another specific area named 'Recording Speed Version' field of $N^{th}$ byte.

The 'Recording Speed Version' field is divided into two parts. First 4-bits are allocated to record first version information therein and second 4-bits are allocated to record second version information therein. Hence, the first and second version information, to which 4-bits are allocated each, enable to represent maximum 15 versions.

Hence, if the 'Recording Speed Version' field of Nth byte is '0100 0010b', the first and second version information become '4' and '2', respectively. Hence, it means that the recording speed version of the corresponding disc is 'V4.2x'.

Therefore, these values indicate an actual speed by binary notation. L to 111 bytes includes write strategy parameters for each recording speed, which is applied to a disc.

Figure 9:
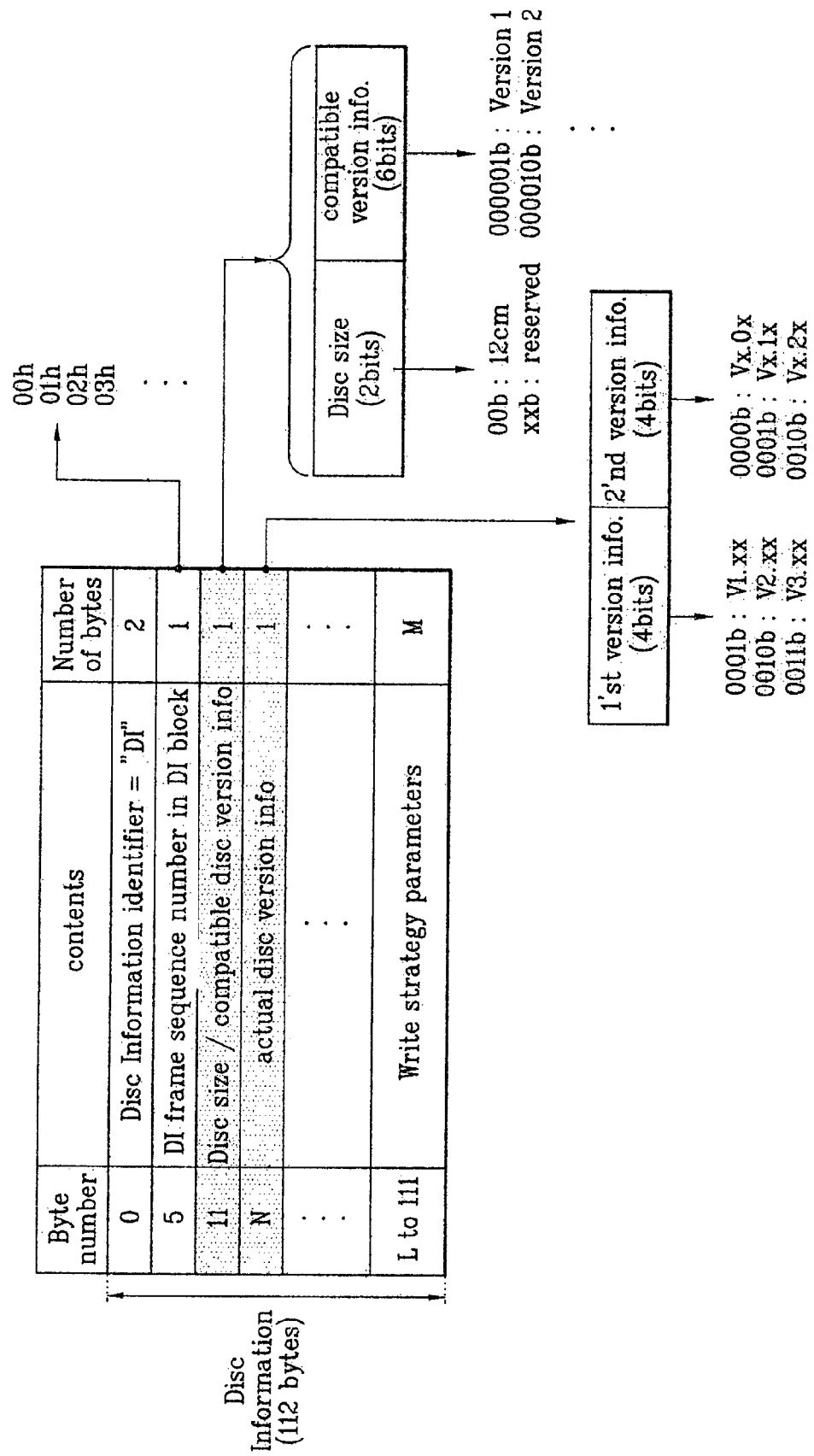

FIG. 9 is a diagram of a method of recording disc control information using disc version information according to another embodiment of the present invention, in which presence of non-presence of compatibility with a previous version is additionally represented by the disc version information.

Referring to FIG. 9, two kinds of version information are recorded within disc information. First version information means real disc information of a current disc and is the version information recorded in $N^{th}$ byte as 'actual disc version info' field. And, a specific recording method in such a field is the same of that in FIG. 4 and its explanation is skipped in the following.

And, second version information means compatible version information compatible with a current disc and previous disc and is recorded in $11^{th}$ byte as 'compatible disc version info' field. In the present embodiment, 6-bites are allocated to the field to represent compatible version information by a specific bit value. Also, alternative allocation is possible, e.g, 4-bits the field as version information of FIG. 1.

If the 11th byte is '00 000010b' and the Nth byte is '0010 0010b', it can be known from the $11^{th}$ byte that a disc size is 12 cm and compatible version information is 'Version 2' (this means that a specific version value can be decided by a specification but fails to mean 'V2.xx'). And, it can be also known from the $N^{th}$ byte that real disc version information is 'V2.2x'.

Therefore, from the disc version information within the disc information, it is able to read out not only the real version information of the current disc but also the compatible version information.

Thus, the disc version information is recorded in the above-described manner by a recording/reproducing apparatus. This is mainly because a recording and/or reproducing apparatus (shown in FIG. 10) correctly reads out the version of the loaded disc to decide whether the disc of the read-out version is recordable/playable or not. An optical disc recording and/or reproducing method using disc version information and apparatus thereof according to the present invention are explained in detail as follows.

Figure 10:
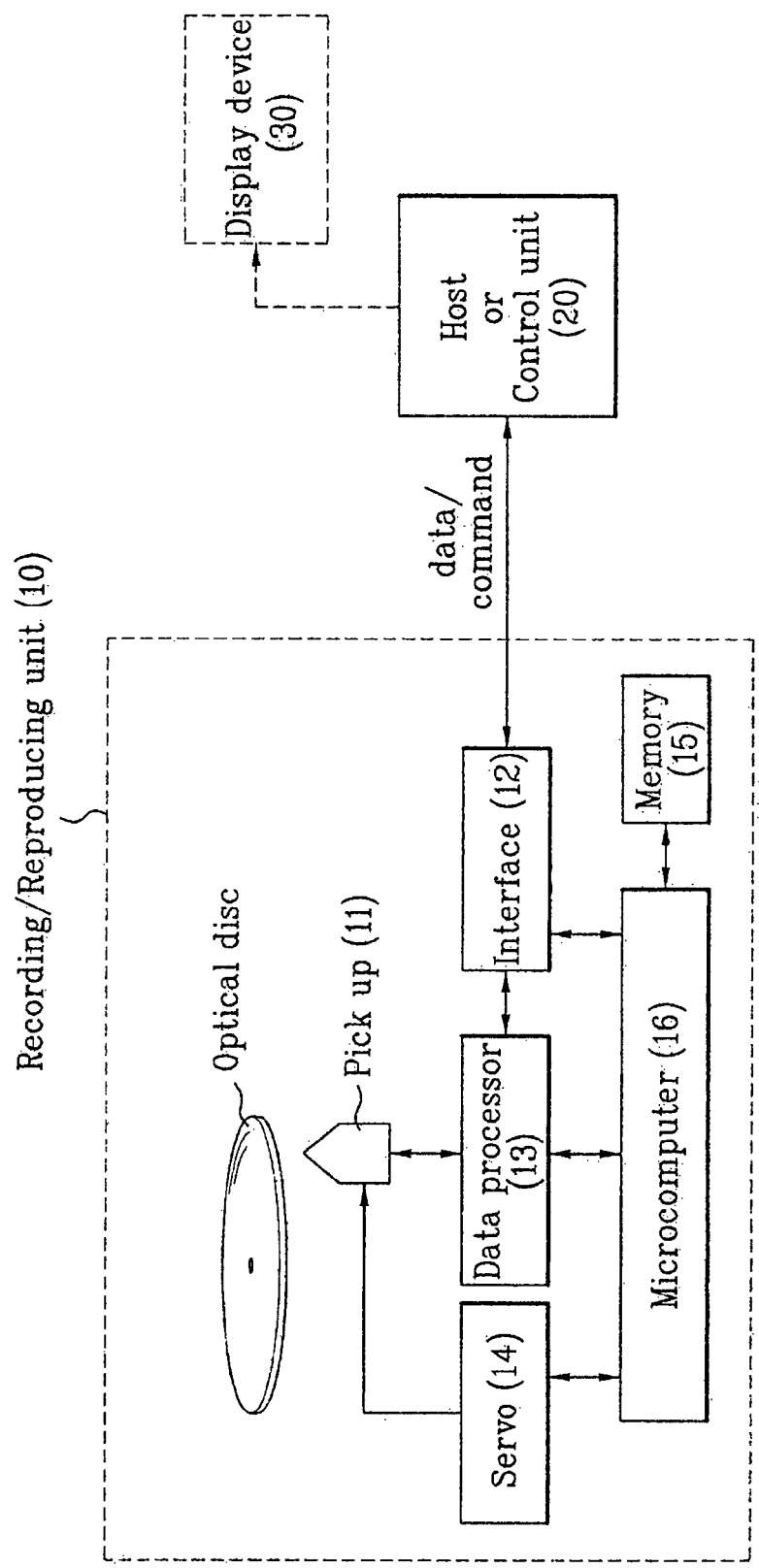
FIG. 10 is a diagram of an optical disc recording and/or reproducing apparatus applicable to the present invention.

FIG. 10 is a diagram of an optical disc recording and/or reproducing apparatus applicable to the present invention.

Referring to FIG. 10, a recording and/or reproducing apparatus according to the present invention includes a recording and/or reproducing unit 10 carrying out recording and/or reproducing on or from an optical disc and a control unit 20 controlling the recording and/or reproducing unit 10. The control unit 20 gives a recording and/or reproducing command for a specific area, and the recording and/or reproducing unit 10 caries out the recording and/or reproducing for the specific area according to the command of the control unit 20.

Specifically, the recording and/or reproducing unit 10 includes an interface unit 12 performing communications with an external device, e.g., host, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc version information, and a microcomputer 16 responsible for controlling the above-described elements within the recording and/or reproducing unit 10.

Apart from the recording and/or reproducing apparatus, a display device 30 displaying a signal played back via the recording and/or reproducing unit 10 or providing a final user of information via the control unit 20 may be provided.

A recording and/or reproducing process of an optical disc according to the present invention is explained in detail as follows.

First of all, once an optical disc is loaded in the optical recording and/or reproducing apparatus, the disc control information recorded in the disc is read out to be temporarily stored in the memory 15 of the recording and/or reproducing unit 10. And, various kinds of the disc control information are utilized for the recording and/or reproducing of the optical disc. Specifically, the control information stored in the memory 15 includes disc information containing the disc version information of the present invention. Hence, the first and second version information recorded within the disc information are read out.

If the disc version supported by the recording and/or reproducing apparatus is 'V1.xx', the microcomputer 16 within the recording and/or reproducing unit 10 decides that the corresponding disc is recordable and/or playable if the first version information within the disc version information read out from the loaded disc is '1' and then notifies the corresponding decision to the control unit 20. The control unit 20 then delivers a normal recording and/or reproducing command to the recording and/or reproducing unit 10. Yet, the microcomputer 16 decides that the corresponding disc is not recording and/or playable if the first version information within the disc version information read out from the loaded disc is equal to or greater than '2' and then notifies the corresponding decision to the control unit 20. The control unit 20 then notifies an announcement message informing that the recording and/or reproducing is impossible via the display device 30 to a user, if necessary.

In so doing, the second version information is basically recordable and/or playable even if it is different. Yet, a recording and/or reproducing apparatus having higher second version information may fail to support a certain function, such as the reading or writing data from or on the optical disc. In such a case, it is also possible to notify an announcement message that a certain function is not supportable to the user via the control unit. For instance, if the disc version supported by the recording and/or reproducing apparatus is 'V1.1x' and the disc version information read out from the loaded disc is 'V1.3x', the recording and/or reproducing is possible because the first version information is identical. Yet, since the second version information of the loaded disc is '1' and corresponds to a previous version, compared to '3' of the second version information the recording and/or reproducing apparatus supports, a certain function of the recording and/or reproducing apparatus may be unusable.

Therefore, the microcomputer 16 within the recording and/or reproducing apparatus compares the first and second version information recorded in the loaded disc to its version information to decide recording and/or reproducing possibility or supportability of the certain function, and then delivers the corresponding decision to the control unit or user, thereby enabling the efficient recording and/or reproducing of the optical disc.

Accordingly, the present invention provides various methods of recording disc version information in a high density optical disc using disc information including the disc version information, and more particularly, using at least two kinds of version information, thereby enabling to uniformly apply the standardized disc information to efficiently cope with the recording and/or reproducing of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording version information of a recording medium, comprising:
    generating version information including first version information and second version information, wherein at least one of the first version information and the second version information is to determine backward compatibility with respect to reading or writing of the recording medium; and
    recording the version information on a specific area of the recording medium,
    wherein the first version information represents a compatible version, and the second version information represents an actual version,
    the first version information being represented by "X1.Y1" and the second version information being represented by "X2.Y2", the second version information for indicating a higher version which is not indicated by the first version information, "X2" of the second version information being equal to or higher than "X1" of the first version information, and "X2.Y2" of the second version information being higher than "X1.Y1" of the first version information,
    wherein the first version information is included in one information byte, and the second version information is represented by one information byte.

2. The method as claimed in claim 1, wherein the second version information comprises a first version part and a second version part.

3. The method as claimed in claim 2, wherein the first and second version parts are allocated by 4-bits respectively within the one information byte.

4. The method as claimed in claim 1, wherein the first version information has a priority to determine the compatibility of the recording medium over the second version information.

5. The method as claimed in claim 1, wherein the recording medium is not accessed by a drive if the first version information is not compatible with the drive.

6. The method as claimed in claim 1, wherein the second version information is to determine a compatibility with a drive to read write data fromon the recording medium.

7. The method as claimed in claim 6, wherein the data is not read or written by the drive if the second version information is not compatible with the drive.

8. The method as claimed in claim 1, wherein the generating step further generates size information to indicate a diameter of the recording medium, and the size information is recorded on the specific area of the recording medium with the version information.

9. A recording medium including a data structure for version information, the version information including first version information and second version information, at least one of the first and second version information is used to determine a backward compatibility with respect to reading or writing of the recording medium, wherein the first version information represents a compatible version, and the second version information represents an actual version, the first version information being represented by "X1.Y1" and the second version information being represented by "X2.Y2", the second version information for indicating a higher version which is not indicated by the first version information, "X2" of the second version information being equal to or higher than "X1" of the first version information, and "X2.Y2" of the second version information being higher than "X1.Y1" of the first version information, wherein the first version information is included in one information byte, and the second version information is represented by one information byte.

10. The recording medium of claim 9, wherein the first and second version information are recorded in a management area within the recording medium.

11. The recording medium of claim 9, wherein the second version information comprises a first version part and a second version part.

12. The recording medium of claim 9, wherein the first version information is allocated by 4-bits or 6-bits within the one information byte.

13. The recording medium of claim 9, wherein the first version information has a priority to determine the writing or reading of the recording medium over the second version information.

14. The recording medium of claim 9, wherein the data structure further comprises size information to indicate a diameter of the recording medium.

15. An apparatus for recording version information on a recording medium, comprising:

a controller configured to generate version information including first version information and second version information, at least one of the first version information and the second version information is to determine backward compatibility with respect to reading or writing of the recording medium; and a recording part configured to record the version information on a specific area of the recording medium, wherein the first version information represents a compatible version, and the second version information represents an actual version, the first version information being represented by "X1.Y1" and the second version information being represented by "X2.Y2", the second version information for indicating a higher version which is not indicated by the first version information, "X2" of the second version information being equal to or higher than "X1" of the first version information, and "X2.Y2" of the second version information being higher than "X1.Y1" of the first version information, wherein the first version information is included in one information byte, and the second version information is represented by one information byte.

16. The apparatus of claim 15, wherein the recording part records the first and second version information in a management area within the recording medium.

17. The apparatus of claim 15, wherein the second version information comprises a first version part and a second version part.

18. The apparatus of claim 17, wherein the first and second version parts are allocated by 4-bits respectively.

19. The apparatus of claim 15, wherein the first version information has a priority to determine the compatibility of the recording medium over the second version information.

20. The apparatus of claim 15, wherein the controller is configured to generate size information to indicate a diameter of the recording medium.

21. The apparatus of claim 20, wherein the recording part is configured to record the size information on the specific area of the recording medium along with the version information.

* * * * *